Patented May 29, 1951

2,554,999

UNITED STATES PATENT OFFICE 2,554,999

ZINC SILICATE PHOSPHOR

John B. Merrill and Alden B. Davis, Towanda, Pa., assignors to Sylvania Electric Products Inc., Salem, Mass., a corporation of Massachusetts No Drawing. Application May 5, 1947, Serial No. 746,167

3 Claims. (Cl. 252—301.6)

This invention relates to luminescent materials, generally called phosphors, and to the process of making the same. It relates particularly to silicate phosphors, such as the zinc silicate series.

Such phosphors are particularly useful in fluorescent lamps, especially those containing mercury vapor. We have found that the lumen maintenance of such phospors is greatly increased by adding a small quantity of arsenic, for example in the form of an oxide, and by addition of lead in addition to the arsenic. The use of both arsenic and lead together greatly enhances the lumen output throughout life.

Arsenic has previously been used, but in larger amounts, to increase the afterglow from the phosphor. We have found that such large amounts reduce the initial brightness of the phosphor in lamps and increase the particle size. For our purpose herein, we prefer quantities not greater than 0.001%, based on the equivalent percentage of arsenic trioxide in the zinc silicate phosphor. A lead percentage of about 0.08% may be used, on the basis of lead oxide in the zinc oxide of phosphor.

In following the invention, we may mix finely powdered and highly purified zinc oxide, containing for example less than 0.000015% arsenic as an impurity, with similarly powdered and purified silica and manganese oxide, and beryllium oxide if desired. The molal ratio of zinc oxide to beryllium oxide may be, for example, 9 to 1, with the combined molal ratio of zinc oxide and beryllium oxide to silica being about 2 to 1, preferably slightly less in order to have a small excess of silica, which is generally desirable. The powders are milled together for thorough mixing, and may then be fired at about 2200° F. for example, for several hours.

Before firing, a small amount of lead oxide, say 0.08% of the total weight of the zinc oxide, may be added and about 0.0008% arsenic trioxide ($As_2O_3$), the latter percentage being based on the total weight of the phosphor. The arsenic may be used without the lead, if desired, although the greatest gain occurs when both are present.

The following table shows the effect of the arsenic addition, the percentage being of arsenic trioxide weight in the total zinc beryllium silicate weight, the silicate being manganese activated.

| $As_2O_3$ Added | Initial Brightness | 100-hour Brightness | 1,750-hour Brightness |
|---|---|---|---|
| 0.000000% | 71.0 | 58.8 | 44.5 |
| 0.000046% | 70.4 | 62.0 | 51.0 |
| 0.000460% | 70.2 | 62.8 | 52.3 |
| 0.000920% | 70.2 | 63.4 | 55.0 |
| 0.002760% | 66.6 | 62.0 | 55.0 |
| 0.004600% | 62.6 | 58.4 | 54.2 |

It will be seen from this table that as the arsenic addition rises above about 0.0009% the initial brightness also falls off and the 100-hour brightness as well, with no appreciable gain in the 1750-hour brightness.

An arsenic content of about 0.0008% arsenic trioxide in the total phosphor weight, or about 0.0006% of the zinc oxide weight is preferred. The arsenic content desirable is generally related to the amount of zinc oxide present, and an amount as great as 0.0003% is generally desirable.

It is seen that the initial brightness drops very slowly at first as the arsenic content is increased, remaining almost constant, but the brightness after many hours life increases over what it would be without the arsenic. As the arsenic content is raised above 0.0009% the initial brightness falls more rapidly, without much gain in brightness later in life. It is therefore best to keep the arsenic content below 0.001%, and certainly not greater than that, although when lead is used with the arsenic, an arsenic content up to 0.002% has at times been possible.

The particle size of the resultant powder will be a minimum with the arsenic content below 0.001%, as the particle size increases above that content. After firing, the resultant powder mass may be easily separated into its separate particles.

Other arsenic compounds than the trioxide may be used, for example, the pentoxide; and other lead compounds than the oxide may be used, for example the fluoride. If other compounds are used, a quantity having the same amount of arsenic as the trioxide, or lead as the dioxide, should preferably be used.

The use of arsenic in the silicate is particularly desirable when the phosphor is to be used in an oxide-cathode fluorescent lamp with the usual inert gas, say argon at low pressure, for example 3 mm. of mercury, and mercury vapor.

While the arsenic is very important to the lumen maintenance throughout life, the quantity used must be very small, as we have explained; so small, in fact, as to be kept somewhat less in magnitude than the amount of iron or aluminum impurities, say 0.001% and 0.002% respectively, which are ordinarily tolerated in the phosphor.

The 0.08% of lead is the preferred amount, but can be varied if desired. Less lead will give a phosphor with poorer maintenance; more lead will generally give a phosphor with lower initial brightness and larger particle size.

A suitable small quantity of manganese, generally added as the oxide or fluoride, is used as an activator in the well-known manner. The arsenic and lead, however, do not function as activators, but rather as means for preserving the brightness of the excited phosphor throughout life, particularly throughout life in a fluorescent lamp with oxide cathode and mercury vapor.

What we claim is:

1. A manganese-activated zinc silicate phosphor having arsenic 0.08% lead incorporated therein for preserving brightness, said arsenic being present in amounts between 0.0001% and 0.0009%, measured in percentage of equivalent arsenic trioxide weight in the phosphor weight.

2. A manganese-activated zinc beryllium silicate phosphor having arsenic and 0.08% lead incorporated therein for preserving brightness, said arsenic being present in amounts between 0.0001% and 0.0009%, measured in percentage of equivalent arsenic trioxide weight in the phosphor weight.

3. A zinc silicate phosphor activated solely by manganese and containing about 0.008% arsenic and 0.08% lead for preserving brightness, said arsenic being measured in percentage of arsenic trioxide weight in the phosphor weight and said lead being measured as percentage of lead oxide in the equivalent zinc oxide weight of the phosphor.

JOHN B. MERRILL.
ALDEN B. DAVIS.

REFERENCES CITED

The following references are of record in the file of this patent:

UNITED STATES PATENTS

| Number | Name | Date |
| --- | --- | --- |
| 2,206,280 | Froelich | July 2, 1940 |
| 2,398,629 | Fonda | Apr. 16, 1946 |

FOREIGN PATENTS

| Number | Country | Date |
| --- | --- | --- |
| 869,448 | France | Feb. 2, 1942 |